United States Patent [19]
Thorp et al.

[11] Patent Number: 5,126,085
[45] Date of Patent: Jun. 30, 1992

[54] PROCESS FOR PREPARING POLYIMIDE SHEET MOLDING COMPOUND

[75] Inventors: John D. Thorp, Chagrin Falls; Joseph P. Reardon, Fairview Park, both of Ohio

[73] Assignee: Dexter Composites, Inc., Cleveland, Ohio

[21] Appl. No.: 624,332

[22] Filed: Dec. 7, 1990

[51] Int. Cl.⁵ .......................................... B29B 11/16
[52] U.S. Cl. ................................. 264/112; 264/126; 264/135; 264/136; 264/257; 264/331.12; 264/331.19; 264/347
[58] Field of Search ............... 264/112, 122, 126, 135, 264/136, 257, 137, 331.12, 331.19, 347; 428/473.5

[56] References Cited

U.S. PATENT DOCUMENTS

| | | |
|---|---|---|
| 3,528,950 | 9/1970 | Lubowitz . |
| 3,573,132 | 3/1971 | Ducloux et al. ............ 264/136 |
| 3,654,227 | 4/1972 | Dine-Hart ................. 264/137 |
| 3,745,149 | 7/1973 | Serafini et al. . |
| 4,141,929 | 2/1979 | Stoops et al. .............. 264/112 |
| 4,302,575 | 11/1981 | Takekoshi ................ 264/331.19 |
| 4,568,505 | 2/1986 | Bollen et al. ............. 264/331.19 |
| 4,765,942 | 8/1988 | Christensen et al. ........ 264/331.12 |
| 4,880,584 | 11/1989 | Jones et al. .............. 264/331.19 |

OTHER PUBLICATIONS

Childs, *Plastics Engineering*, "DESIGN," Feb. 1989.
"New Sheet Molding Compounds to Vie with Laminates and Metals: New Design Options Possible," Dexter Composites Division, The Dexter Corporation, May, 1989.
"New Sheet Molding Compounds to Vie with Laminates and Metals: New Design Options Possible," Dexter Composites Division, The Dexter Corporation, Jul. 25, 1989.
"Dexter Offers Rapid Processing of PMR-15 Parts," Dexter Composites Division, The Dexter Corporation, Oct. 13, 1989.
"HyComp M-300 Series, PMR-15 Based Sheet Molding Compounds," Dexter Composites Division, The Dexter Corporation, May, 1989.
"HyComp M-315, E-Glass/PMR-15 Sheet Molding Compound," Dexter Composites Division, The Dexter Corporation, Sep., 1989.

*Primary Examiner*—Jeffery Thurlow
*Attorney, Agent, or Firm*—D. Peter Hochberg; Mark Kusner; Louis J. Weisz

[57] ABSTRACT

A process for making polyimide sheet molding compounds which involves the preparation of a polyimide precursor solution of adjusted viscosity that includes a mixture of high and low boiling alcohols, and which also includes monomeric reactants including a diester of an aromatic dianhydride, an aromatic diamine, a monoester of norbornene dianhydride, the reactants being present in a relative molar ratio selected to yield a polyimide having a desired molecular weight. The solution, which further contains particular amounts of staple reinforcing fibers is deposited as a sheet between two carrier film layers and is partially dried to remove the low boiling alcohols. The molecular weight of the polyimide and the amount of any insoluble components present in the solution are controlled so that when the sheet molding compound is imidized under particular heating conditions, its melt viscosity will allow the melted polyimide to retain the staple fibers present therein uniformly distributed throughout the melt as it flows throughout molds into which the sheet molding compounds are placed.

14 Claims, 1 Drawing Sheet

PROCESS FOR PREPARING POLYIMIDE SHEET MOLDING COMPOUND

TECHNICAL FIELD

This invention relates to a method for preparing high performance molding compounds reinforced by filamentary material contained therein. More particularly, this invention relates to polyimide sheet molding compounds containing reinforcing staple fibers. Specifically, this invention relates to a method for preparing sheet molding compounds that employs novel processing techniques and processing conditions to prepare such compounds, and to compression molded products made therefrom.

BACKGROUND OF THE INVENTION

Composite materials are employed throughout industry in the manufacture of a wide variety of products ranging from automotive exterior body panels to high-cost, high-performance advanced composites, used for example in aerospace applications. Commonly, sheet molding compounds, referred to as SMCs, are used to prepare composite products, the compounds taking the form of composite sheets ready to be used for fabricating finished products, particularly those of the compression molded type. SMCs are made by combining a thermosetting resin matrix with reinforcing materials, and sometimes other modifiers, to form the sheets, such compounds having been used for many years to form low-cost, non-critical structures.

The matrices employed in preparing SMCs commonly are selected from resins such as polyesters, epoxies, vinyl esters, phenolics and the like, while the included reinforcing materials may take the form of glass, carbon and other fibers, reinforcing fillers, and combinations of the preceding, depending upon the properties required of the molded products ultimately to be formed.

Although sheet molding compounds have been widely employed, they have primarily been considered as being useful for preparing low-cost, non-critical structures. However, particularly with the advent of the space age, needs have developed for laminated and molded products capable of functioning in harsh environments, for example, where operating temperatures commonly range up to 600° F. While a few exotic resins have been developed that can withstand such conditions, these have often been expensive, as well as difficult to process.

In the relatively recent past, however, a family of thermosetting polyimides has been developed whose members are not only able to function successfully in the environments described, but which are easy to process and are cost effective. These materials and the processes for preparing them, for example, are described more particularly in U.S. Pat. Nos. 3,528,950 and 3,745,149, the teachings of which are incorporated herein by reference.

The polyimide materials referred to exhibit low friction, high wear resistance, low creep, and good dimensional stability; consequently, they lend themselves to a variety of applications including the fabrication of self-lubricated parts, and for high temperature uses such as in engine parts and aircraft brakes.

Polyimides, possessing the notable properties described, have, for instance, heretofore been used in the preparation of bulk molding compounds, i.e., particulate polyimides containing reinforcing fibers usually up to about ¼ inch in length. While such compounds lend themselves to molding intricately shaped products, unfortunately, the shortness of the fibers providing the reinforcement detrimentally affects structural strength, thus limiting the use of the products made therefrom to non-structural applications.

The polyimides have also been used in the form of laminates utilizing continuous fiber reinforcements, including those of the unidirectional, woven, knit, or braided variety. While these reinforced polyimide structures have greatly superior mechanical properties compared to the bulk molding compounds, they tend to be expensive and to be impractical for molding small and intricately shaped objects since it is difficult to conform the laminates to the surfaces of the objects.

While the use of such polyimides in conjunction with reinforcing filamentary material longer than the short fibers of the bulk molding compounds described, but shorter than the continuous fibers referred to, would be highly desirable in forming sheet molding compounds, the fabrication of satisfactory SMCs from such longer fibers is not easily accomplished. In this regard, the reinforcing fibers must be combined with a polyimide precursor solution having a viscosity that assures thorough wetting of the fibers by the solution. This is required so that satisfactory bonding of the fibers to the polyimide resin subsequently formed can be achieved. On the other hand, the viscosity must not be so low that the solution is forced out of the molding compound sheet during the process of its formation.

Furthermore, the sheet must have sufficient adhesiveness of "tack" so that the carrier film layer covering each side of the sheet will remain in place, and also so that layers of the sheets are able to adhere to each other during the process of conforming them to the molds, i.e., the "lay-up" process.

In addition, the sheets must possess sufficient "draping" ability, that is pliability, to allow them to be conformed to the surfaces of the mold.

Also, prior to being cross-linked, and after being imidized and melted, the then flowable polyimides must possess the ability to carry the contained fibers along as the resin/fiber mixture flows under pressure into all parts of the molds prior to being cross-linked. This is important since satisfactory mechanical properties, i.e., strength and stiffness, are dependent upon uniform dispersal of the fibers within the resin.

Unfortunately, some of the above-described properties are imcompatible with each other under ordinary processing conditions. For example, while good wetting is facilitated by a dilute polyimide precursor solution, a dilute solution tends to cause the precursors to be expelled by the pressures involved in formation of the sheets, and to interfere with proper tack and drape of the sheets. Conversely, if too little solvent is present, the sheets are too dry, causing them to lack the necessary tack and draping qualities.

BRIEF DESCRIPTION OF THE INVENTION

In view of the preceding, therefore, it is a first aspect of this invention to provide sheet molding compounds useful for fabricating products capable of withstanding harsh environments.

A second aspect of this invention is to provide a process for preparing polyimide sheet molding compounds.

An additional aspect of this invention is to provide a process for preparing polyimide sheet molding compounds that assures adequate wetting of the contained filamentary reinforcing material by the polyimide precursor solution.

Another aspect of this invention is to provide a process that provides polyimide sheet molding compounds that display good handling characteristics, including satisfactory tack and drape.

A further aspect of this invention is to provide products that display superior strength and stiffness, fabricated by the compression or autoclave molding of polyimide sheet molding compounds.

Yet a further aspect of this invention is to provide a method for preparing molded products from polyimide sheet molding compounds in which the filamentary reinforcing material flows substantially uniformly together with the polyimide resin to all parts of the mold prior to the cross-linking process.

Still another aspect of this invention is to provide polyimide composite materials that are suitable for fabricating small and intricately shaped products of superior strength.

The foregoing and other aspects of this invention are provided by a process for preparing polyimide sheet molding compounds comprising: (1) preparing a monomer solution from monomeric reactants comprising a diester of an aromatic dianhydride, an aromatic diamine, and a mono-ester of norbornene anhydride, together with a mixture of alcohols, at least one of the alcohols having from 1 to 2 carbon atoms, and at least one of the alcohols having from 4 to 6 carbons atoms; combining the monomer solution with filamentary material to form a polymerizable blend; and thereafter removing at least part of the alcohols having from 1 to 2 carbon atoms from the polymerizable blend.

The foregoing and additional aspects of the invention are provided by a polyimide sheet molding compound prepared by the process of the preceding paragraph.

The foregoing and further aspects of this invention are provided by a process for preparing a polyimide sheet molding compound comprising: preparing a monomer solution from monomeric reactants including a diester of an aromatic dianhydride, an aromatic diamine, and a monoester of norbornene anhydride, together with a mixture of alcohols at least one of the alcohols having from 1 to 2 carbon atoms, and at least one of the alcohols having from 4 to 6 carbon atoms, the monomer solution having a viscosity of from about 400 centipoise to 2,000 centipoise; combining the monomer solution with staple fibers to form a polymerizable blend, placing the blend between two layers of a carrier film in the form of a sheet; and heating the sheet to a temperature at which at least part of the alcohols having from 1 to 2 carbon atoms are removed, but at which at least part of the alcohols having from 4-6 carbon atoms are retained.

The foregoing and still additional aspects of the invention are provided by a polyimide sheet molding compound prepared by the process of the preceding paragraph.

The foregoing and yet other aspects of the invention are provided by a cross-linked polyimide composite structure prepared from a polyimide sheet molding compound according to the preceding paragraph.

BRIEF DESCRIPTION OF THE DRAWINGS

The invention will be better understood when reference is had to FIG. 1, which is a schematic diagram showing a process for preparing the sheet molding compounds of the invention.

DETAILED DESCRIPTION OF THE INVENTION

Figure 1:
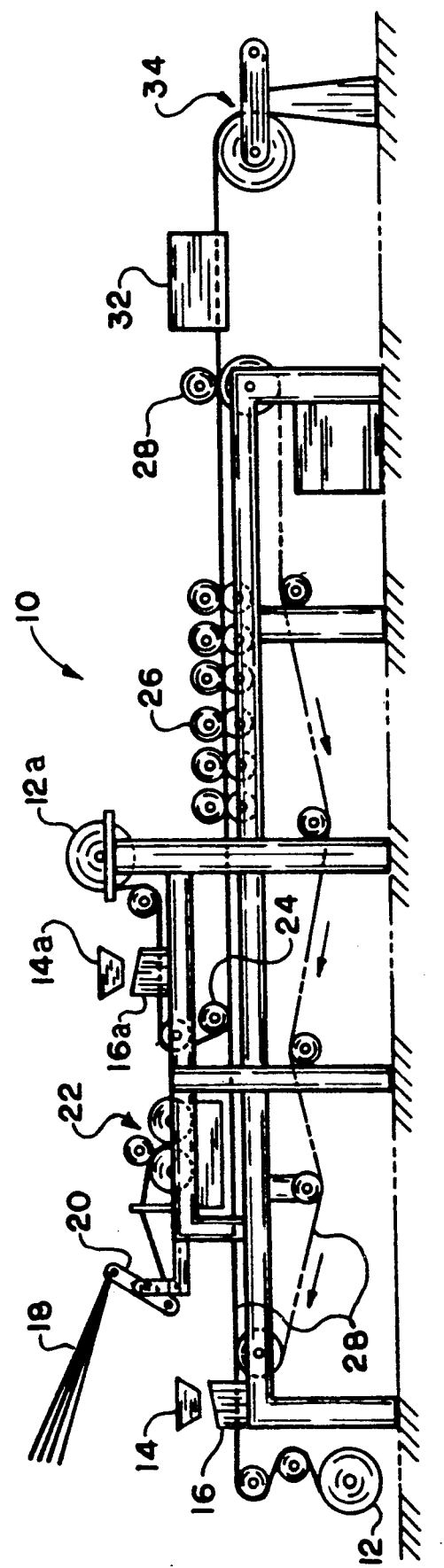

Products made from the polyimide sheet molding compounds of the invention display a number of outstanding properties compared to products made from the bulk molding compounds containing the shorter fibers previously described. In this regard, the polyimide sheet molding compounds of the invention yield cross-linked products having a tensile strength in the order of from about 60,000 to 70,000 psi and a modulus of about 5 Msi, compared to tensiles of only 15,000 psi and a modulus of about 2 Msi for the bulk molding compounds described. The cross-linked polyimide products of the invention also display a useful life of over 2,000 hours at temperatures in excess of 550° F., and up to 1,000 hours at 600° F. In addition, they provide char yields on the order of 70%, providing an insulating barrier against the spread of flame.

The process for preparing the sheet molding compounds involves the mixing of monomeric reactants including a diester of an aromatic dianhydride, a diamine and a monoester of norbornene anhydride, with alcohol. The viscosity of the solution is controlled so that when the resulting solution is subsequently mixed with reinforcing fibers and deposited between layers of carrier film to form a sheet, the pressure of sheet formation will not cause the solution to be squeezed from the sheet. Following its formation as described, the sheet is heated and the lower boiling alcohols are substantially removed by evaporation since they are present in amounts far too high for proper tack and drape of the sheets. The higher boiling alcohols are retained, however, in view of the fact that some degree of solvency is necessary in order to achieve a satisfactory degree of tack and drape.

In the process of using the sheet molding compounds, the carrier films between which the sheet compounds are formed are removed, and the sheets are draped around a mold having the shape of the product desired. The mold is then heated to the temperature at which imidization occurs, causing the higher boiling alcohol to be volatilized, and the shaped, imidized material is further heated, melting in the process, until a temperature is reached at which cross-linking of the polyimide occurs. Control of the melt viscosity of the polyimide is important during the molding stage, since all of the components, i.e., the polyimide resin, the reinforcing fibers, and if present, particulate fillers, must move in concert to fill every portion of the mold cavities. If this does not occur, for example, if the melt viscosity of the resin is too low, the resin will flow by itself, leaving the fiber and fillers behind, resulting in an inferior product.

The process is illustrated in FIG. 1 which is a schematic diagram showing a process for preparing the sheet molding compounds of the invention. In the FIGURE, a sheet molding compound processing line is shown, generally 10, in which carrier film from the roll 12 is fed past idler rolls to the upper surface of a carrier film support conveyor 28. There, polyimide precursor solution dispenser 14 deposits precursor solution on top of the carrier film, where it is uniformly spread by a doctor blade 16. Concurrently, side-by-side fiber tows 18 enter a cutting cylinder assembly 22 after passing a tow tensioning bar 20 and are cut into staple fibers which are deposited on the polyimide precursor solution as the carrier film moves to the right in the FIGURE. A second carrier film roll 12a feeds anothr layer of carrier film past a precursor solution dispenser 14a from which a layer of polyimide precursor solution is deposited on the film, being uniformly spread thereon by a doctor blade 16a. The film thus coated is then inverted at a combining roll 24, forming a laminate, i.e., carrier film/precursor solution/staple fiber/precursor solution/ carrier film. As the laminate continues moving to the right, it comes into contact with grooved compaction rollers 26 which serve the purpose of mixing the layers of precursor solution with the fibers. The sheet then proceeds past a final compaction roller 28, where smoothing of the sheet takes place, and thereafter passes into an oven 32 where the lower boiling alcohols are removed, as previously described. The finished sheet molding compound is then wound onto a sheet wind-up assembly 34, or alternatively, cut into flat panels on a cutting table. In the latter case, sheets of a desired size facilitate handling and shaping about mold structures, prior to being imidized and cross-linked during the molding process.

While in the FIGURE an oven 32 serves to remove a sufficient amount of the alcohol to provide proper drape and tack in the sheet molding compounds when controlled at about 200° F., the sheet may alternatively be passed over heated rollers to accomplish the same purpose.

The carrier film employed in the process may be made from any of a number of materials such as, for example, nylon, polyethylene, polypropylene, or others. In addition, and although not usually necessary, the film can be perforated or fabricated in a vapor-permeable form to facilitate alcohol loss during the drying procedure.

As indicated, it is necessary that the polyimide precursor solution have a viscosity low enough to thoroughly wet the reinforcing filamentary fibers, but not so low that the precursor material would be expelled from the sheet molding compound during its formation, for example, at the compaction or smoothing rollers due to the pressure there applied. In this regard, it has been found that when the viscosity of the polyimide precursor solution is adjusted from about 400 to about 2,000 centipoise, about 1,000 centipoise being preferred, satisfactory wetting can be achieved without loss of the solution during the sheet forming process.

Suitable adjustment of the viscosity may be accomplished by adjustment of the relative amount of the alcohol mixture to the solids, e.g., the aromatic dianhydride ester, the diamine, and the esterified norbornene compound present. In the case of preparation of a precursor solution having a viscosity of from about 1,000 to 2,000 centipoise, for example, the solution will contain about 70–75% by weight of solids.

Viscosity adjustment can also be achieved by adding to the solution finely ground, i.e., on the order of 325 mesh or finer, polyimide powder. The powder, which is not yet cross-linked, becomes a suspended solid in the liquid solution, but later in the molding stage melts and becomes chemically and physically indistinguishable from the balance of the polyimide resin, the precursors for which were present in the precursor solution.

The low boiling alcohol used to prepare the polyimide precursor solution will be selected from methanol or ethanol, the former being preferred in most instances because of its relatively low cost. However, if only the low boiling alcohol is used, too much of it tends to be lost during drying of the sheet molding compound, resulting in the loss of necessary drape and tack characteristics. Consequently, it has been found desirable to also add a high boiling alcohol to the solution so that sufficient alcoholic solvent will be left after the alcohol drying step to assure that the sheet molding compound can be satisfactorily arranged in the mold. In this regard, it has been found that the use of alcohols having 4 to 6 carbon atoms, including such alcohols as hexyl, butyl, amyl, and pentyl are satisfactory for this purpose if present in an amount of as little as about 2 parts per 100, based on the weight of the polyimide precursor solution present.

With respect to the nature of the polyimide precursors, the patents previously referenced and incorporated herein, describe a variety of monomers suitable for forming the polyimides contemplated by the invention and methods for preparing them. In addition, the materials are readily available commercially.

In the case of the diester dianhydrides, they may be formed by combining an alcohol, for example methanol or ethanol, with the selected dianhydride and heating the mixture to its reflux temperature and maintaining it there until the desired diester is formed. Representative of the many dianhydrides which may be employed include pyromellitic dianhydride; 3,3',4,4'-benzophenone tetracarboxylic dianhydride; 2,3,6,7-naphthalene tetracarboxylic dianhydride; 1,2,5,6-naphthalene tetracarboxylic dianhydride; 2,2',3,3'-diphenyl tetracarboxylic dianhydride; bis (3,4-dicarboxyphenyl) sulfone dianhydride; 1,4,5,8-naphthalene tetracarboxylic dianhydride and others. In this connection, and with respect to the carbonyl bridge in the benzophenone compound, the carbonyl bridging group can alternatively be a hexafluoro-substituted carbon, a sulfoxide-substituted carbon, a thionyl-substituted carbon, an ether bridge, or other bridge linkages.

In the case of the aromatic diamines, any of a variety of compounds can be employed including benzidine; 4,4'-methylenedianiline; 4,4'-thiodianiline; 4,4'-oxydianiline; 4,4'-diaminodiphenyl sulfone; m-phenylenediamine; p-phenylenediamine and others. As in the case of the dianhydrides, and in regard to the dianiline compounds, the bridging group can alternatively be any of those mentioned in connection with the dianhydrides.

With respect to the norbornene-type ester compounds, while other related compounds may also be employed, it has been found desirable to use the monomethylester of 5-norbornene-2,3-dicarboxylic anhydride. The compound can be made, for example, by refluxing the counterpart anhydride with methyl alcohol until the monoester has been formed. The use of an ethyl ester also provides satisfactory results insofar as the polyimides of the invention are concerned.

In the case of the dianhydrides, the diester is formed preferentially in the esterification reaction described, while the monoester is formed preferentially in the case of the norbornene-type esters.

Any of a variety of reinforcing materials may be employed, for the sheet molding compounds, for example, glass fibers, carbon fibers, ceramic fibers, and other reinforcing materials, if desired, in combination with any of various fillers such as calcium carbonate, aluminum trihydrate, carbon spheres and others. Fibers used for reinforcing purposes will desirably be from about ⅛ to 2 inches in length. The materials described will be added in the amount necessary to provide sufficient "body" to the melted polyimide during molding so that it is not so "watery" that satisfactory molding is difficult to achieve, and in the amount needed to achieve satisfactory reinforcement. In this regard, it has been found desirable to include a loading of 42-60% by volume of the reinforcing material, based on the cross-linked polyimide product to be produced, while in a preferred embodiment, the loading will be from about 50 to 60%.

Referring again to FIG. 1, specifically to the cutting of the tow, it has been found desirable to coat the tow with sizing to facilitate the cutting operation. In the case of the carbon fibers, an epoxy sizing material in an amount of 0.5-1.2% by weight of the fiber is sufficient, while in the case of glass fibers, which are the preferred reinforcing material in many applications, an amino or carboxylic silane size comprising about 0.5% by weight of the filaments will be satisfactory. It is desirable to avoid excessive amounts of size since such amounts can produce voids in the cross-linked resin as a consequence of size decompostion.

Where fibers are employed as reinforcing material, the production of staple carbon fibers from tows of up to about 3,000 filaments has been found to be preferable due to the difficulty in separating individual cut filaments produced from tows with significantly more filaments.

As previously mentioned, the melt viscosity of the polyimides prepared from the sheet molding compounds of the invention is important if the staple reinforcing fibers are to be carried along with the resin throughout the mold. This viscosity is affected by a number of factors, including the formulated molecular weight of the polyimide, its time-temperature history, including the imidization reaction heating, the heating rate during molding, as well as the presence of any imidized powder fillers which may have been added to the precursor solution. With respect to such viscosity, it has been found desirable to adjust the melt viscosity to betwen about $10^2$ poise to about $10^5$ poise so that satisfactory dispersal of the reinforcing fibers throughout the mold will take place.

With respect to the molecular weight of the polyimide, a formulated molecular weight of from about 1,400-1,600 is desirable in order to achieve a proper melt viscosity. Within such range, a polyimide material having a formulated molecular weight of about 1,500, referred to in the trade as a "PMR-15", is preferred. In the case of the most preferred embodiment of the invention, the PMR-15 will be prepared by adjusting the monomeric components of a polyimide precursor solution to include a diester of 3,3',4,4'-benzophenone tetracarboxylic dianhydride; 4,4'-methylene dianiline, and a monoester of 5-norbornene-2,3-dicarboxylic anhydride, the monomeric components being present in a molar ratio of about 2:3:2.

The molding of the sheet molding compounds of the invention is accomplished by laying-up the sheets about the mold and heating them to from about 180°-400° F., during which period imidization occurs. Heating is continued through the resin's melting point of about 520° F., to its cross-linking temperature of about 550°-600° F. The volatiles generated during imidization are essentially eliminated during the imidization stage so that the subsequently formed cross-linked polymer is essentially void free. Compression molding of the preferred polyimides of the invention is readily accomplished at from about 250-500 psi.

While in accordance with the patent statutes, a preferred embodiment and best mode has been presented, the scope of the invention is not limited thereto, but rather is measured by the scope of the attached claims.

What is claimed is:

1. A process for preparing thermosetting polyimide sheet molding compounds comprising:
   preparing a monomer solution from monomeric reactants comprising a diester of an aromatic dianhydride, an aromatic diamine, and a monoester of norbornene anhydride together with a mixture of alcohols, at least one of said alcohols having from 1 to 2 carbon atoms, and at least one of said alcohols having 4 to 6 carbon atoms; combining said monomer solution having a viscosity of from about 400 to about 2000 centipoise with staple filamentary material to form a polymerizable blend, and
   removing at least part of said alcohols having from 1 to 2 carbon atoms from said polymerizable blend.

2. A process according to claim 1 in which said monomeric reactants comprise (a) a diester of 3,3',4,4'-benzophenone tetracarboxylic dianhydride, (b) 4,4'-methylenedianiline, and (c) a monoester of 5-norbornene-2,3-dicarboxylic anhydride.

3. A process according to claim 2 in which said esters are methyl esters.

4. A process according to claim 2 in which reactants (a), (b), and (c) are present in the molar ratio of approximately 2:3:2.

5. A process according to claim 1 in which said alcohol mixture is a mixture of at least one alcohol selected from a first group of alcohols consisting of methyl and ethyl alcohol, and at least one alcohol selected from a second group of alcohols consisting of hexyl, butyl, amyl and pentyl alcohol.

6. A process according to claim 5 in which said filamentary material is in the form of staple fibers selected from the group consisting of glass fibers and carbon fibers.

7. A process according to claim 6 in which said fibers are glass fibers.

8. A process according to claim 6 in which said sheet molding compound is formed into a desired shape and heated until a polyimide is formed having a formulated molecular weight of from about 1,400 to about 1,600, said polyimide then being further heated until cross-linking occurs, thereby forming a fiber-reinforced composite structure.

9. A process according to claim 8 in which the cross-linked polyimide contains from about 42% to about 60%, by volume, of said fibers.

10. A process for preparing a thermosetting polyimide sheet molding compound comprising:
    preparing a monomer solution from monomeric reactants including a diester of an aromatic dianhydride, an aromatic diamine, and a monoester of norbornene anhydride together with a mixture of alcohols, at least one of said alcohols having from 1 to 2 carbon atoms, and at least one of said alcohols having from 4 to 6 carbon atoms, said monomer solution having a viscosity of from about 400 centipoise to about 2,000 centipoise;
    combining said monomer solution with staple fibers to form a polymerizable blend and placing said blend between two layers of a carrier film as a sheet, and heating said sheet to a temperature at which at least part of said alcohols having from 1 to 2 carbon atoms are removed, but at which at least part of said alcohols having from 4 to 6 carbon atoms are retained.

11. A process according to claim 10 which said monomeric reactants comprise a diester of 3,3',4,4'-benzophenone tetracarboxylic dianhydride; 4,4'-methylenedianiline; and a monoester of 5-norbornene-2,3-dicarboxylic anhydride, said reactants being present in the molar ratio of approximately 2:3:2.

12. A process according to claim 11 in which said fibers are glass fibers.

13. A process according to claim 12 in which said sheet molding compound is subsequently formed into a desired shape and heated to produce imidization and cross-linking, thereby providing a reinforced composite structure in which the cross-linked material contains from about 42% to about 60%, by volume, of said fibers.

14. A process according to claim 13 in which the polyimide thus formed has a melt viscosity of from about $10^2$ poise to about $10^5$ poise before cross-linking.

* * * * *